(12) United States Patent
Gamble et al.

(10) Patent No.: US 11,401,770 B2
(45) Date of Patent: Aug. 2, 2022

(54) HARDFACED METAL SURFACE AND METHOD OF MANUFACTURE

(71) Applicant: Hydril USA Distribution LLC, Houston, TX (US)

(72) Inventors: Jamie Clay Gamble, Houston, TX (US); Eric Larson, Houston, TX (US); Brian Baker, Houston, TX (US); Daya Singh, Houston, TX (US); Joseph Incavo, Houston, TX (US); William Miller, Houston, TX (US); Melissa Newbury, Houston, TX (US); Mark Reinmuller, Houston, TX (US)

(73) Assignee: Hydril USA Distribution LLC, Houston, TX (US)

( * ) Notice: Subject to any disclaimer, the term of this patent is extended or adjusted under 35 U.S.C. 154(b) by 551 days.

(21) Appl. No.: 16/131,344

(22) Filed: Sep. 14, 2018

(65) Prior Publication Data

US 2019/0309595 A1 Oct. 10, 2019

Related U.S. Application Data

(60) Provisional application No. 62/653,699, filed on Apr. 6, 2018.

(51) Int. Cl.
*E21B 33/06* (2006.01)
*C22C 19/07* (2006.01)
(Continued)

(52) U.S. Cl.
CPC .......... *E21B 33/063* (2013.01); *B32B 15/013* (2013.01); *C21D 1/42* (2013.01); *C22C 19/07* (2013.01); *C22F 1/10* (2013.01)

(58) Field of Classification Search
CPC ................. E21B 33/063; B32B 15/013; B32B 2307/536; C21D 1/42; C22C 19/07; C22F 1/10
(Continued)

(56) References Cited

U.S. PATENT DOCUMENTS 3,196,538 A 7/1965 Zachman
3,615,309 A * 10/1971 Dawson ................. C22C 19/056
51/309

(Continued)

FOREIGN PATENT DOCUMENTS

CN 1524157 8/2004
CN 201826806 5/2011
(Continued)

OTHER PUBLICATIONS

International Search Report and Written Opinion dated Jun. 28, 2019 in corresponding PCT Application No. PCT/US19/25487.
(Continued)

*Primary Examiner* — Kevin F Murphy
*Assistant Examiner* — Jonathan J Waddy
(74) *Attorney, Agent, or Firm* — Osha Bergman Watanabe & Burton LLP

(57) ABSTRACT

An apparatus is disclosed as including a first material volume with at least a hardened portion and a second material volume that includes at least two layers. The first material volume is composed of at least a hardenable alloy of steel. The at least two layers is located adjacent to a first surface comprising the hardened portion of the first material volume. The at least two layers includes a first layer composed of at least a ductile low-carbon alloy of steel and a second layer composed of at least a cobalt-based hardfacing over the first layer. The apparatus is applicable in preparing
(Continued)

shear ram blocks and shear ram blades to provide a hardened blade edge with an adjacent hardfacing surface.

13 Claims, 5 Drawing Sheets

(51) Int. Cl.
  *C22F 1/10*     (2006.01)
  *C21D 1/42*     (2006.01)
  *B32B 15/01*    (2006.01)

(58) Field of Classification Search
  USPC .......................................................... 428/679
  See application file for complete search history.

(56) References Cited

U.S. PATENT DOCUMENTS

| | | | |
|---|---|---|---|
| 3,880,436 A * | 4/1975 | Canal | E21B 33/062 |
| | | | 277/325 |
| 4,081,027 A | 3/1978 | Nguyen | |
| 4,302,256 A * | 11/1981 | Kenton | C21D 6/00 |
| | | | 148/622 |
| 4,618,269 A | 10/1986 | Badrak | |
| 5,803,431 A | 9/1998 | Hoang | |
| 6,244,336 B1 * | 6/2001 | Kachich | E21B 33/063 |
| | | | 166/55 |
| 6,414,258 B1 | 7/2002 | Amano | |
| 9,752,405 B1 * | 9/2017 | Jennings | E21B 29/08 |
| 2004/0003919 A1 * | 1/2004 | Johnson | E21B 33/063 |
| | | | 166/55 |
| 2006/0144586 A1 * | 7/2006 | Urrutia | E21B 33/063 |
| | | | 166/55 |
| 2006/0213654 A1 * | 9/2006 | Scallen | E21B 43/006 |
| | | | 166/85.4 |
| 2008/0078081 A1 | 4/2008 | Huff | |
| 2008/0105341 A1 | 5/2008 | Huff | |
| 2011/0226477 A1 * | 9/2011 | Springett | E21B 33/063 |
| | | | 166/298 |
| 2012/0067563 A1 * | 3/2012 | Jellison | E21B 17/042 |
| | | | 166/85.4 |
| 2012/0073816 A1 * | 3/2012 | Springett | E21B 33/062 |
| | | | 166/298 |
| 2013/0153204 A1 | 6/2013 | Carbaugh | |
| 2014/0048245 A1 | 2/2014 | Yendell et al. | |
| 2016/0097250 A1 | 4/2016 | Bleck | |
| 2016/0138356 A1 * | 5/2016 | Ellison | E21B 33/062 |
| | | | 166/377 |
| 2016/0215584 A1 * | 7/2016 | Tennant | E21B 33/064 |

FOREIGN PATENT DOCUMENTS

| | | |
|---|---|---|
| CN | 102536150 | 7/2012 |
| CN | 107532265 | 1/2018 |
| JP | S50-38602 | 1/1975 |

OTHER PUBLICATIONS

ASM Handbook, vol. 1: Properties and Selection: Irons, Steels, and High-Performance Alloy, pp. 140-194 (1990).
Chinese Office Action dated Nov. 29, 2021 in corresponding CN Application No. CN 201980024135.2 (and English translation).

* cited by examiner ent application is related to and claims the benefit
HARDFACED METAL SURFACE AND METHOD OF MANUFACTURE

RELATED APPLICATIONS

The present application is related to and claims the benefit of priority from U.S. Provisional Application No. 62/653,699, titled HARDFACED METAL SURFACE AND METHOD OF MANUFACTURE, filed on Apr. 6, 2018, the entirety of which is incorporated by reference herein.

TECHNICAL FIELD

The present application discloses subject matter relating to an induction-hardened metal surfaces in close proximity to hardfaced metal surfaces that may be applicable in shear ram applications of a blowout preventer (BOP) and to methods for manufacturing such hardened metal volumes and hardfaced metal surfaces.

BACKGROUND

Blowout preventers (BOPs) may be used in subsea drilling operations to protect an oil well from pressure surges in the well. BOPs may include a series of rams aligned with a central bore. A drill pipe extends through the central bore and into the well below the BOP. Each set of rams may include one ram on either side of the central bore. Some rams may be designed to seal against the drill string when closed, but not to cut the drill string. Some other rams include blades, and are designed to shear the drillstring (and anything else in the central bore) when the rams are closed to completely seal the top of the well. These are referred to as shear rams, which include shear ram blocks and shear blades. When the shear rams are activated, pistons push the shear ram blocks through their housing and through the drillstring, causing the shear ram blocks and shear blades to close across the bore. This action simultaneously shears any pipe, tools, or other objects in the bore and seals the well. As the shear rams close, the shear ram blocks and blades are exposed to the wellbore pressure, which may be very high, such as more than 15,000 pounds per square inch (psi). In addition, the rough surface of the sheared tubular inside the central bore may subject the shear ram block to possibly damaging action.

SUMMARY OF THE INVENTION

Systems and methods in accordance with various embodiments of the present disclosure may overcome one or more of the aforementioned and other deficiencies experienced in shear rams that are subject to stress and other damage when shearing is activated. Additionally, hardening an edge may be obtained by local thermal processes (induction heating, for example), but this may cause cracking of materials in areas adjacent to the hardened area (e.g., the hardened edge). This may be a result of differential expansion based at least on the properties of the different materials in the adjacent areas. In the present disclosure, an apparatus, such as a component for use as a shear blade or as part of the shear blade or of a shear ram block is disclosed. The apparatus includes a first material volume of a heat treatable (e.g., capable of being hardened by austenitizing and rapid cooling) alloy of steel with at least a portion that has been hardened and a second material volume formed of a welded overlay of a ductile low-carbon alloy of steel (including stainless steel variants) as a first layer and a cobalt-based hardfacing as a second layer. The first material volume is located adjacent to the second material volume such that a first surface of the first material volume is located adjacent to a hardfacing surface formed by the second material volume. As such, the overlay is two-layered and is located adjacent to the first surface of the first material volume and located on the second surface.

As such, the first material volume, as used herein and unless indicated otherwise, generally refers to a heat treatable (e.g., capable of being hardened by austenitizing and rapid cooling) alloy of steel with at least a portion that has been hardened and that includes a first surface and a second surface. The second material volume, as used herein and unless indicated otherwise, generally refers to a welded overlay and includes a first layer and a second layer. The first layer, as used herein and unless indicated otherwise, generally refers to a low-strength and low-carbon ductile alloy of steel (including stainless steel variants). The second layer, as used herein and unless indicated otherwise, generally refers to a cobalt-based hardfacing. The first surface, as used herein and unless indicated otherwise, generally refers to a surface of the first material volume. The second surface, as used herein and unless indicated otherwise, generally refers to a recessed surface portion of the first material volume over which the second material volume is provided. The hardfacing surface, as used herein and unless indicated otherwise, generally refers to a surface of the second material volume.

The method, accordingly, includes providing the first material volume comprising the first surface and the second surface. The first material volume may be composed of at least a heat treatable alloy of steel. The second surface may be depressed or recessed relative to the first surface. An overlay, as previously described, is provided on the second surface as at least a two-layer overlay. The two-layer overlay includes at least a first layer of a ductile low-carbon alloy of steel on the first surface and at least a second layer of a cobalt-based hardfacing over the first layer. In addition, such an overlay may be provided in a two-step welding process, wherein the first layer is welded on first, followed by the second layer. The two-layer overlay is, therefore, adjacent to the first surface of the first material volume and is over the second surface of the first material volume. As a result of such an application and such an apparatus, when the apparatus is subject to subsequent thermal processing to harden at least a portion of the first material volume, the first layer provides a cushion for unequal thermal expansion of the dissimilar materials during the rapid heating and quenching portions of the hardening process. Additionally, as the low-carbon steel of the first layer is not capable of hardening (i.e. not heat treatable), there are minimal effects from an induction hardening process, which is beneficial to the survival of the cobalt-based hardfacing. Further, the use of the first layer of ductile low-carbon alloy of steel also eliminates a need for post-weld heat treatments after the hardfacing surface is repaired.

In an example, phase changes and associated instantaneous volume changes that may occur in a portion of the first material volume and in a portion of the low-strength and low-carbon ductile first layer that are subject to rapid heating and cooling. These volume changes are accommodated by deformation in the low-strength and low-carbon ductile first layer. This deformation in the first layer protects the cobalt-based hardfacing of the second layer from thermal stresses and cracking during the hardening process. As a result, such a method and apparatus is able to attain a required hardness for at least exposed portions of the first material volume, while preventing imperfections in the apparatus, and in particular to the second material volume. For example, the first layer provides protection to thermal expansion stresses for the second layer. The hardening of the first material volume along with the two-layer overlay transforms at least a portion of the first material volume into a different hardness relative to the remaining portion of the first material volume. The hardness of the second material volume remains relatively unchanged by the hardening process.

BRIEF DESCRIPTION OF THE DRAWINGS

Various embodiments in accordance with the present disclosure will be described with reference to the drawings, brief descriptions of which are provided as follows.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various other functions can be implemented within the various embodiments as well as discussed and suggested elsewhere herein.

Figure 1:
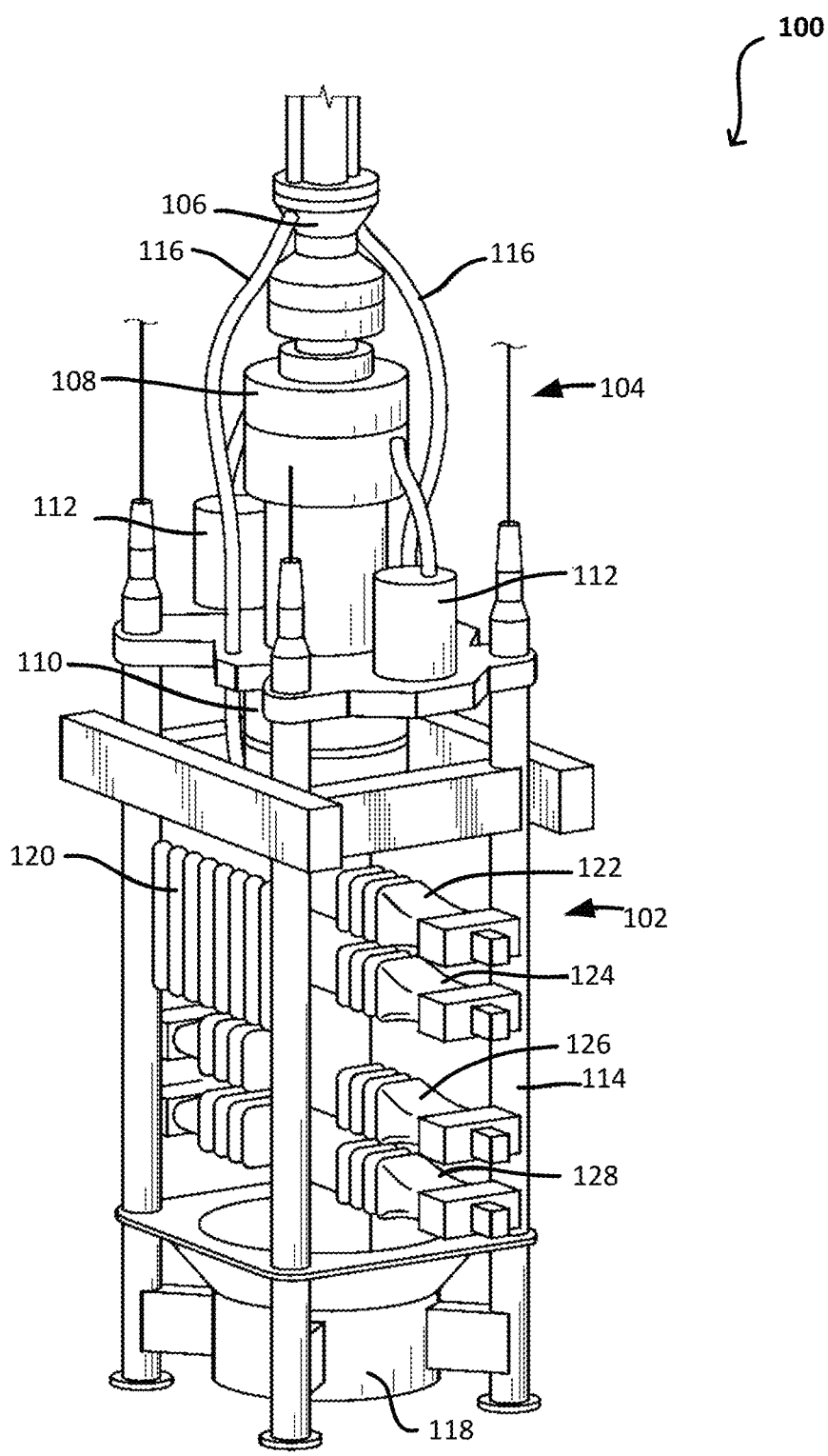
FIG. 1 illustrates an example BOP stack assembly attached to a wellhead in accordance with various embodiments.

FIG. 1 illustrates an example 100 of a BOP stack assembly attached to a wellhead in accordance with various embodiments. The BOP stack assembly may be a subsea assembly, though the apparatus and method presently disclosed is applicable to land, subsea, and surface applications. The BOP stack assembly includes a lower stack assembly 102, and an upper stack assembly 104, forming a lower marine riser package (LMRP). The upper stack assembly 104 may include, for example, a riser adapter 106, annular blowout preventers 108, 110, control pods 112, and choke and kill lines 116. The lower stack assembly 102 may include a frame 114 with a wellhead connector 118 at the lower end for connecting to a subsea wellhead assembly, as well as hydraulic accumulators 120. Typically, a bore runs through the BOP assembly, including through the upper and lower stack assemblies 102, 104, which bore may contain a pipe (e.g., reference numeral 224 in FIG. 2). A shear ram housing 122 is normally located above pipe ram housings 124, 126, 128 on the lower stack assembly 102. The shear ram housing 122 may contain upper and lower ram shear blocks (illustrated in FIG. 2 as reference numerals 202, 204 attached to upper and lower blades 206, 208). Each pipe ram housing 124, 126, 128 may include pipe ram blocks with semi-circular recesses on the mating faces for closing around different size ranges of pipe. When open, the shear and pipe ram blocks are positioned on either side of the bore. When closed, the shear ram blades 206, 208 seal off the bore. The terms shear ram blade, shear blade, or blade are used interchangeably herein to refer to blades 206, 208. When one or more pipes (e.g., reference numeral 224 in FIG. 2) is present in the bore and when the shear ram blades 206, 208 are activated, the shear ram blades 206, 208 will shear the pipe.

Figure 2:
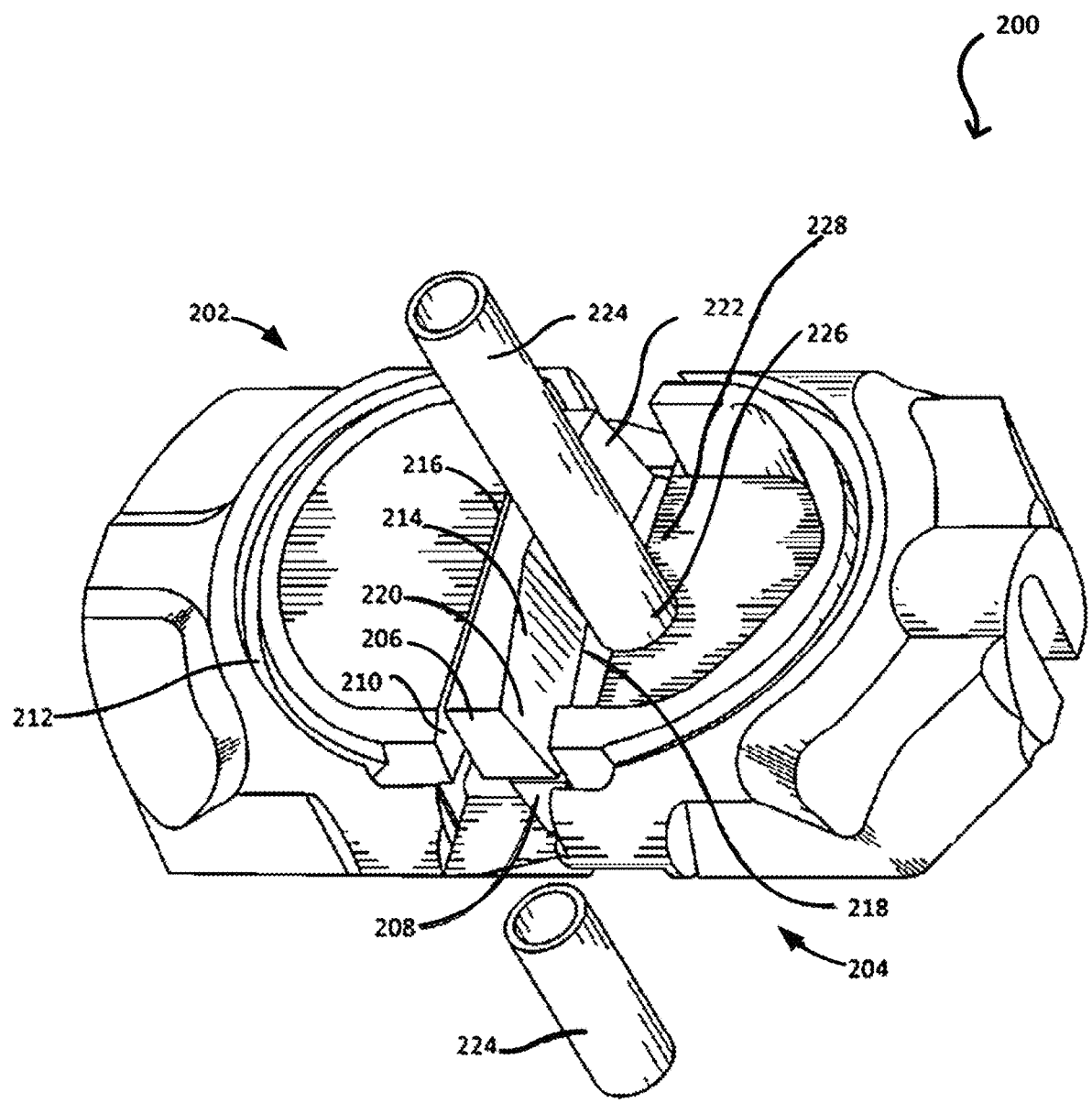
FIG. 2 illustrates, in a perspective view, an upper and a lower shear ram after shearing or closing over a sheared pipe, in accordance with an example aspect of this disclosure.

FIG. 2 illustrates, in a perspective view 200, an upper and a lower shear ram after shearing or closing over a sheared pipe 224, in accordance with an example aspect of this disclosure. FIG. 2 also illustrates the upper and the lower shear ram blocks 202, 204 removed from the shear ram housing 122 and in a partially closed position. The upper shear ram block 202 has a lateral surface that defines a face or forward end 210. Further, a person of ordinary skill would recognize that the lower shear ram 204 may have a similar forward end which mates with the upper shear ram 202. The upper blade 206 mounts to the forward end 210 of the upper ram block 202. The upper shear ram block 202 has a rear end 212, which may be an extent of a sealing surface that isolates the wellbore pressure when the ram is fully closed. The upper blade 206 has a forward face 220 with an upper edge 214 and a lower forward edge 218. In this disclosure, the term forward, as to the ram blocks, is in reference to forward end 210 of each of the shear ram blocks 202, 204, to which each of the blades 206, 208 is attached.

In the example of FIG. 2, the lower forward edge 218 of the upper blade 206 extends farther forward from the forward end 210 of the upper shear ram block 202 than upper edge 214. The upper blade 206 includes a rear surface 216, which may be fixed or removable with forward end 210 of the upper shear ram block 202. Forward face 220 of the upper blade 206 may also be generally concave or converging at about the center, sloping in from reference numeral 214 and away towards end 222 of the upper blade 206. This results in a recessed face relative to the more forward portions of the face 220 at outer ends marked by reference numerals 220, 222. Alternatively, different shapes for the upper blade 206 may be applied. As may be seen, when the shear ram blocks 202, 204 are closed, the blades 206, 208 overlap, thereby shearing pipe 224 positioned between the ram blocks 202, 204 in the bore of the BOP. In addition, as can also be seen, the edge of the bottom edge (generally indicated in reference numeral 226) of the top half of sheared pipe 224 rubs and rests against the upper surface 228 of the lower blade 208. In an alternative implementation—as illustrated in the subsequent example of FIGS. 3A and 3B, each of the upper and the lower shear ram may be formed of a single block and blade without a requirement for a detachable block and blade as may be the case in the example of FIG. 2.

The lower blade 208 is illustrated as including a leading edge that overhangs a bottom edge, thereby providing a shearing action from at least the leading edge to the pipe 224. The shear ram blades 206, 208 and other surfaces, e.g., reference numeral 228, of the shear ram may, therefore, require hardening in at least certain surface portions and underlying material to protect the sealing offered by the shear ram block and the blades from damage incurred during the shearing process. For example, the upper surface 228 of the lower block 204 is a hardfacing surface. The edge of the blade may benefit from hardening when the apparatus of the present disclosure is used in blades for shearing drilling tubulars and wireline. The wireline refers to cabling used to lower measurement devices and other equipment into the wellbore for the purposes of evaluation, recovery, or well intervention. In addition, hardfacing may also be required to provide corrosion resistance adjacent to the blade edge (e.g., area 228) for effective sealing and to protect such a sealing area from damage incurred during the shearing process.

As such, hardfacing surface 228 represents a seal surface on the lower shear ram block 206 that benefits from the hardfacing protection of possible damage incurred by sheared edge 226 of the pipe 224. The detachable (e.g., bolted) blade to shear ram block example configuration, as well as in the integral block and blade example configuration benefit from the hardened blade edges that exceed the hardness of the drill pipe 224 and incur minimal damage during shearing. However, a large portion of the damage may be incurred directly behind the blade edges, where the sealing occurs. For this reason, the hardfacing offered by the second layer of the second material volume, as discussed throughout this disclosure, is beneficial. Without hardfacing, the area adjacent to the blade edge at the surface of the lower ram block, being of a soft base material (also referred to as the first material volume herein), would be subject to damage that may compromise its structure and its performance.

Figure 3A:
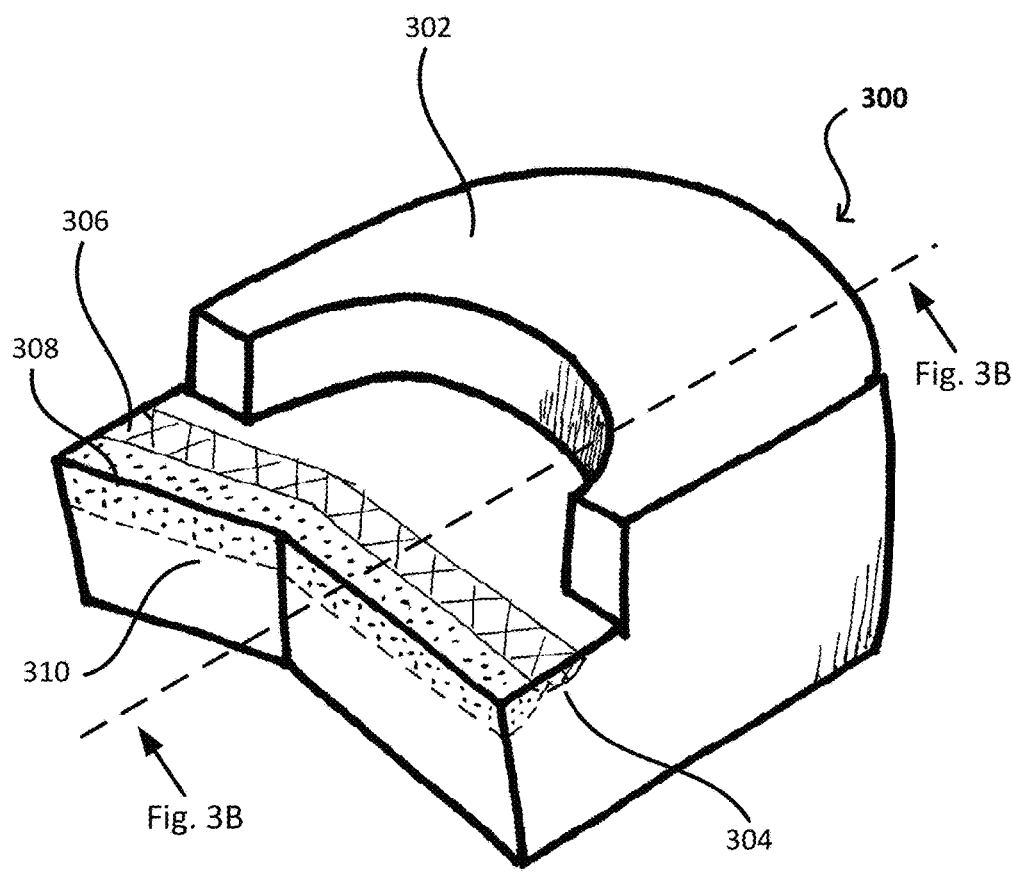
FIGS. 3A and 3B are different views of a lower shear ram including a hardened portion of a first surface and a two-layered overlay over a second surface, in accordance with an example of the present disclosure.

FIG. 3A illustrates a first view of a lower shear ram 300 including block 302, a hardened portion 308 of a first material volume 310, which is adjacent to the protective overlay 306. Further, in this disclosure, reference numeral 308 is used to also refer to a first surface of the first material volume 310. Further, a person or ordinary skill, upon reading the present disclosure would recognize that portion 308 is interchangeably referred to as hardened portion 308 and the context of the discussion in each case is provided or may be understood to either be the portion or the hardened portion depending on the stage of manufacture. The lower shear ram 302 may be composed of a shear ram block and shear blade. The protective overlay 306 is over a second surface 304, in accordance with an example of the present disclosure. A person of ordinary skill would recognize that second surface 304 refers to a surface of the first material volume 310 that existed before the overlay of the second material volume 312, 314 were added. The first material volume 310, along with block 302 may be manufactured as a single apparatus that may be subject to localized thermal processes to create the hardened portions 308. For example, the apparatus comprising at least of a part of the first material volume 310, and of portions 304, 308, 312, and 314 may be a blade attached to a shear ram block 304. In an alternate aspect, the first material volume 310 and block 304 may be manufactured as a single apparatus included as a single shear ram block. In yet another alternative, the present apparatus and method may be used to prepare a hardened portion of the first surface that is adjacent to a hardfacing surface 306, which is a surface of the second of the at least two-layer overlay and formed by cobalt-based hardfacing. As such, this alternative apparatus and this alternative method may be used in applications requiring protection of one surface (and underlying material), while an adjacent surface requires induction hardening—e.g., using induction heating and rapid cooling to increase hardness.

Figure 3B:
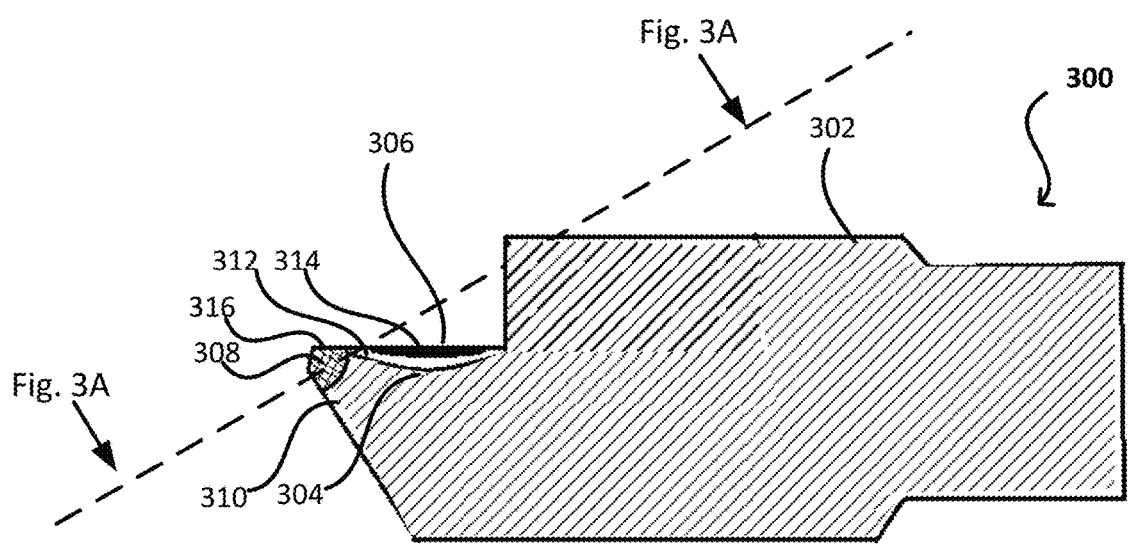

FIG. 3B illustrates a side view of FIG. 3A. Particularly, the side view illustrates the lower shear ram 300 including block 302, a hardened portion 308 of a first surface 316, which is adjacent to the protective overlay 306. The lower shear ram 300 may be composed of a shear ram block and shear blade as a single unibody structure or as two separate, but attached structures as discussed elsewhere in this disclosure. The protective overlay 306 is over a second surface 304, in accordance with an example of the present disclosure. As such, the first material volume 310 (including portion 308) and the second material volume 312, 314 may be manufactured as a single apparatus that is then subject to localized thermal processes to create the hardened portion 308 and that is then attached to the block 302. For example, the apparatus may be a blade attached to a shear ram block. In an alternate aspect, the first material volume 310 (including portion 308 and the remainder of the block 302) and the second material volume 312, 314 may be manufactured as a single apparatus included in the shear ram block. In yet another alternative, the present apparatus and method may be used to prepare a hardened portion 308 of the first material volume 310 adjacent to the hardfacing surface 306. As such, this alternative apparatus and this alternative method may be used in applications requiring a hardfacing surface, while an adjacent surface is subject to induction heating and rapid cooling to increase hardness.

In an example, the first material volume 310 including portion or surface 308, and the second surface 304 may be a heat treatable alloy of steel and may be of sufficient strength and hardness to perform the pressure sealing but with a limited maximum hardness to meet industry standard specifications for corrosion resistance (i.e. the block base material is much softer than that required at the blade edge to perform the shearing function). For example, the heat treatable alloy of steel may include CrMoV Steel, NiCrMo Steel, or CrNiMo Steel. Each of these examples may include varying compositions of two or more of iron (Fe), carbon (C), manganese (Mn), copper (Cu), titanium (Ti), phosphorous (P), chromium (Cr), molybdenum (Mo), vanadium (V), silicon (Si), Sulfur (S), and nickel (Ni). For example, known trade name materials with the above compositions include 8630, 8630M, or 4140, which are applicable for use as the first material volume (i.e., underlying base material). Alternatively, any other material is available as the first material volume including the first and the second surfaces—such as any alloy steel with appropriate chemistry to allow hardening by heating (austenitizing) followed by rapid cooling. Such appropriate chemistry may be readily understood to a person of skill in the art upon reading this disclosure.

The second surface that is adjacent to the first surface may have a depression or height difference when compared to the first surface. The depression or height difference allows an overlay, forming the second material volume, to be applied so as to maintain an angled, but flat surface, across the different materials—e.g., across the first surface and across the overlay applied over the second surface that is adjacent to the first surface. The overlay may be a two-layer overlay to form the second material volume. Such a two-layer overlay includes a ductile non-hardenable steel (e.g., low-carbon steel) welded to the depressed surface (i.e., second surface 304) of the first material volume to provide a first layer 312—e.g., welded over the heat treatable alloy of steel. Such ductile low-carbon steel may plainly include iron and carbon, but may additionally include other elements in small quantities that do not affect the intended properties of the plain iron and carbon composition. This material may be a low-carbon steel having chemistry that does not allow for significant hardening during the induction hardening process applied to the first and second material volumes. The other elements allowed for the ductile low-carbon steel of the first layer include one or more of manganese, silicon, and copper. The individual proportions of one or more of these other elements for the ductile low-carbon steel may be between 0.5 wt % and 1.65 wt % of the final first layer composition.

The two-layer overlay that forms the second material volume includes a second layer 314, which is a welded-on layer over the first layer. For example, the second layer is a cobalt-based hardfacing alloy that is welded to the ductile low-carbon steel. Such a cobalt-based hardfacing alloy may include substantial cobalt, and varying proportions of chromium, tungsten, carbon, nickel, iron, silicon, manganese, and molybdenum. The substantial cobalt may be anywhere from 50 wt % to 75 wt % of the final second layer material. Further, the substantial cobalt may be anywhere from 60 wt % to 68 wt % of the final second layer material. The proportion of chromium may be from 27 wt % to 32 wt %, while tungsten may be 4 wt % to 6 wt %, and carbon may be present as 0.9 wt % to 1.4 wt %, of the second layer material. All composition ranges in this disclosure include the starting and ending values. There are known trademarked materials capable of use in welding for the cobalt-based hardfacing alloy. For example, a known trademarked material with the above compositions—for the second layer—includes Stellite® 6 (ERCCOCR-A) alloy. The remaining materials, nickel, iron, silicon, manganese, and molybdenum, may be added in trace quantities. This welded-on cobalt-based hardfacing alloy is welded in a manner to ensure metallic ductile low-carbon steel weld does not penetrate into the hardenable base material. For example, the temperature of the weld process is controlled to within a temperature range that will not allow the underlying ductile low-carbon steel from melting further or penetrating the underlying heat treatable alloy of steel.

Figure 5:
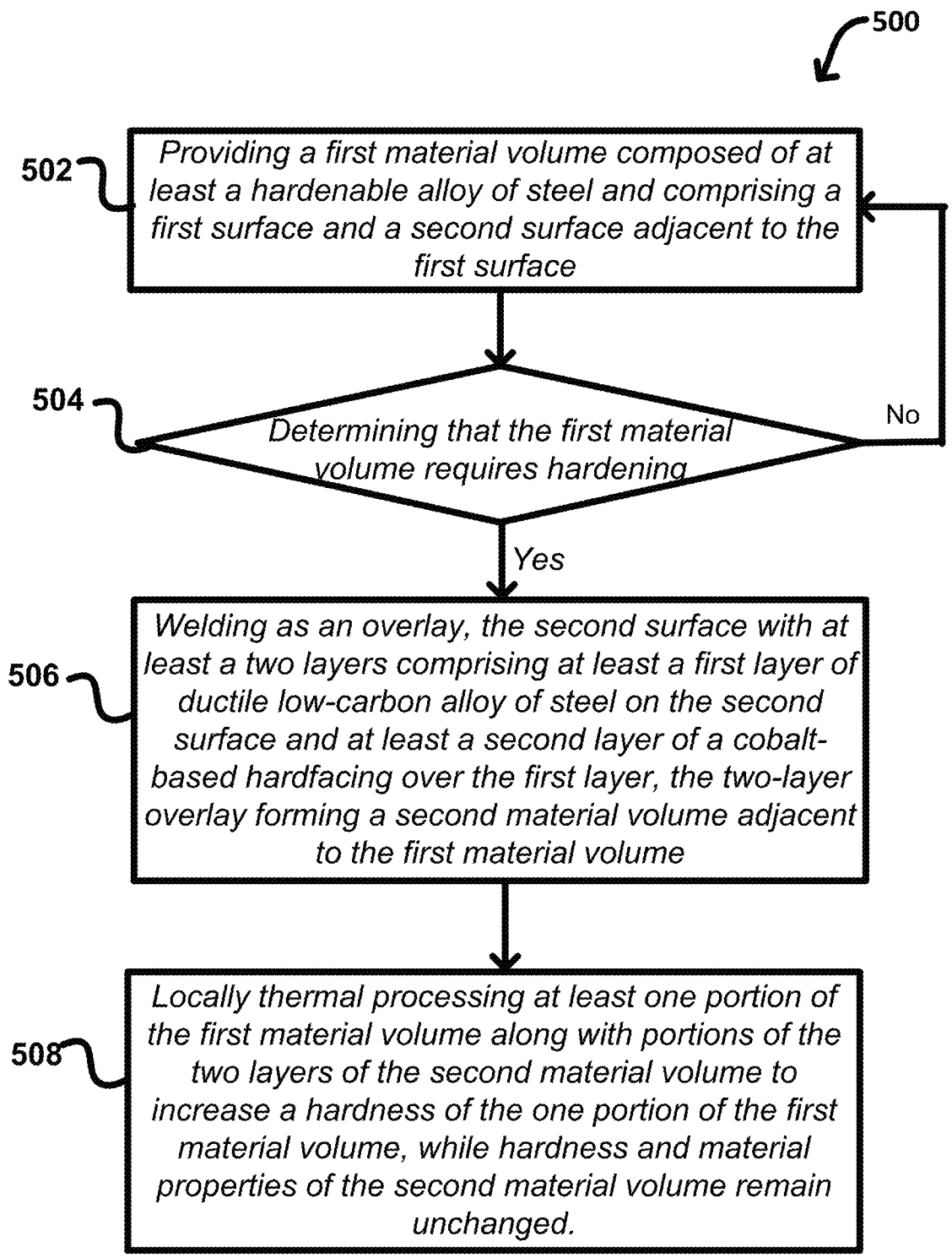
FIG. 5 is a flowchart for a method of hardfacing a surface in accordance with aspects of this disclosure.

While FIG. 3 illustrates the first layer 312 and the second layer 314 as adjacent layers, a person of ordinary skill reading this application would recognize that the first layer 312 is at least below the second layer 314, and may also be on the sides of the second layer 314. As such, the second layer may be in a depression of the first layer 312. This is illustrated in the image of FIG. 5. As previously mentioned, the ductile low-carbon steel of the first layer 312 provides a cushion to protect the cobalt-based hardfacing from strain caused by unequal thermal expansion of the dissimilar materials—such as the base material 310 and the second layer 314 overlying the first layer 312—during the rapid heating and quenching process for hardening at least a portion 308 of the first surface 316 of the base material 310. Protection is also achieved from instantaneous volume changes caused by phase changes in the first material volume 310 and first layer 312. Additionally, as the ductile low-carbon steel is not hardenable, there is minimal opportunity for the induction hardening that is applied during the hardening to the first surface, to cause a phase change within the ductile low-carbon steel.

The cobalt-based hardfacing—second layer 314—is then processed to remove surface imperfections and geometric discontinuities between the overlay 312, 314 and the first surface 316 that forms part of the hardened portion 308, which is adjacent to hardfacing surface 306. For example, a liquid penetrant inspection and other non-destructive examinations could be performed to the final apparatus, and any imperfections and geometric discontinuities identified may be processed by some form of physical or chemical shaping to achieve an intended surface—mostly uniform, for instance. The base material—the first material volume 310 including the first surface 316 and the portion 308—immediately adjacent to the cobalt-based hardfacing is subjected to an induction heat treatment or hardening to locally bring the base material into an austenitic state. This also subjects the front portion of the cobalt-based hardfacing of the hardfacing surface 306 and layer material of the second layer 314 to heat and thermal stresses from the heat treatment. A portion 308 of the base material 310, may then be in the austenitic state, and is quenched in a bath that may be water, polymer, or oil to increase the local hardness and produce the hardened portion 308. As such a person of ordinary skill would recognize the illustration of portion 308 may be referenced by the same reference numeral before and after hardening. The result of this process is a hardening of the exposed portion 308 of first material volume 310, while the first layer 312 protects the second surface 304 and adjusts to accommodate the effect of the hardening applied to the first surface 316 and portion 308. This allows the cobalt-based hardfacing 314 to remain intact. In an application, the first surface 316 and portion 308 may be an edge of the shearing ram blade. Such a hardened edge is appropriate for shearing wellbore tubulars, with a corrosion resistant hardface—provided by the overlay of the first and the second layers—immediately adjacent to the hardened edge. As such, the hardened edge and the corrosion resistant hardface provide a continuous hard surface resistant to abrasion and damage.

The above geometry aspect also presents in the implementation of the cobalt-based hardfacing, which follows the same general shape of the first surface 316 being induction heated. For example, when the apparatus is a shear ram blade, the profile of the blade edge required for the shearing action requires a high temperature for hardening and also requires a single session of hardening. Hardening after application of the second layer directly to the base material of the second surface 304 results in cracking of the second layer 314 caused by volumetric expansion due to a phase change in volume one, unequal thermal expansion and a rigid constraint between dissimilar metals. The first layer 312 is applied to the base material, directly or indirectly, followed by the second layer 314, both of which form a second material volume with a surface 306 that provides the hardfacing protection from damaging shear action to the pipes and corrosion resistance for adequate sealing performance. The second layer 314 is adjacent to the first surface 316 of the first material volume 310. As such, the first layer 312 prevents cracking and other defects that the second layer 314 is susceptible to during the rapid heating and cooling of the portion 308 of first material volume 310.

Portions of the lower shear ram may be tested for hardness properties. Such portions may include portions of the first surface 316 and the overlay 312, 314 at surface 306, in accordance with various embodiments of this disclosure. The overlay 312, 314 is immediately adjacent to the blade edge that forms the first surface 316. As such, the second material volume comprising the overlay 312, 314, in the overlay sections, may be tested to determine that their hardness achieves a predetermined requirement to function as protection from the shearing of the pipe. The hardness of edge portions 308 (or first surface 316) of the first material volume 310 that is exposed to the hardening process is also tested to be in an expected range of hardness to properly function under the shearing requirements and to remain structurally sound after the shearing.

Figure 4:
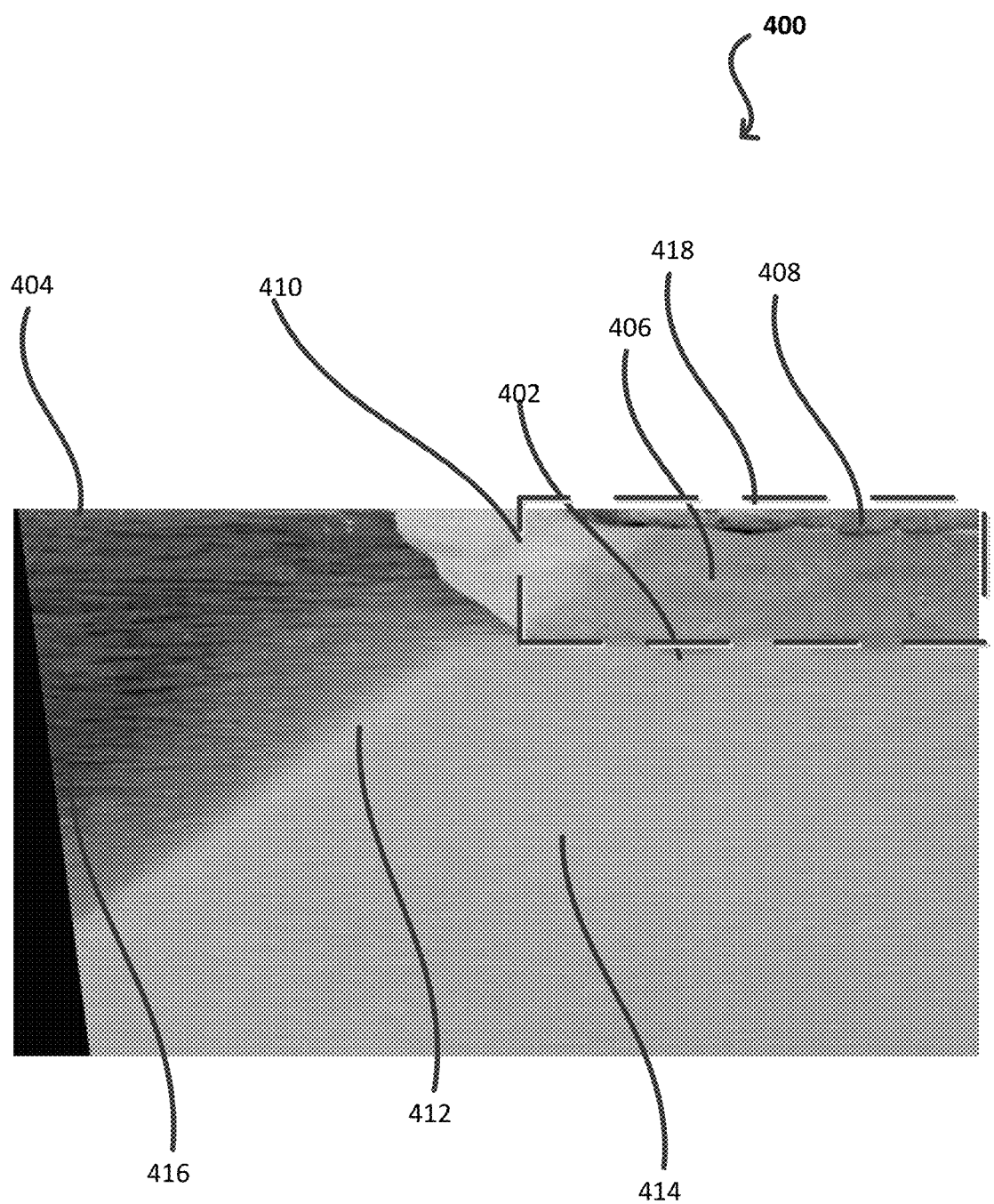
FIG. 4 is a macro photo of a cross-section of a lower shear ram including portions of the first surface after hardening and the overlay over a second surface in accordance with various embodiments of this disclosure.

FIG. 4 is a macro photo of a cross-section 400 of the lower shear ram including portions of the first surface 404 of the first material volume 414 after hardening to provide portion 416. The two-layered overlay 406, 408 forms the second material volume 410 having a hardfacing surface 418, in accordance with various embodiments of this disclosure. The first material volume 414 also includes a second surface 402 over which the second material volume 410 is applied. As illustrated in the figure, a uniform surface for the apparatus in image 400 is obtained via the present process. The first surface 404 includes portions 416 of the first material volume 414 that has been hardened after the application of the second material volume 410 (dashed lines provided to indicate that the second material volume includes material forming the first layer 406 and material forming the second layer 408 over the first layer 406). The overlay (layers 406, 408) is applied over the recessed second surface of first material volume 414, generally illustrated as reference numeral 402. The term overlay as used in the present disclosure may include multiple layers and is generally understood as one or more layers overlying an underlying material. As such, a reference to an overlay or a second material volume 410 as including two reference numerals 406, 408 is understood as including, for example, two layers of overlaying features. While FIG. 4 shows that the second surface 402 as covered by the overlay 410, a person of ordinary skill would recognize that, before the overlay 410 was applied, reference numeral 402 was recessed and the overlay 406, 408 was applied to increase the structure shown in FIG. 4. As such, even though recessed and covered, reference numeral 402 still refers to a surface (referenced elsewhere as the second surface) before the overlay is applied, for illustrative purposes.

The overlay 406, 408 is applied near to the first surface 404 that forms an area intended for hardening. In addition, there may be an overlap of the first surface 404 with the first layer 406, but as the first layer is non-hardenable, there is no disadvantage from such a construction. In FIG. 4, the first surface 404 and the second surface 402 of the first material volume 414 are a single material composed of a heat treatable alloy of steel. The portion 416 including the first surface 404 illustrates a hardened portion with a different hardness relative to a second portion 414 that is transitioned via transition area 412. Such a change is achieved by the present hardening process, which is able to harden at least a portion 404 corresponding to the first surface, without causing damage to the second layer 408, which would otherwise crack due to at least differences in thermal expansion properties during rapid heating and cooling in at least the materials forming the second layer 408 and the second surface 402 of the first material volume 414. The first layer 406, of plain-carbon steel, in one example, over the second surface 402, provides protection to the second layer 408 from thermal expansion differences and volumetric changes in the hardened portion of the first surface 404. In addition, FIG. 4 illustrates a transition zone 412, where the first material volume 414 has been transitioned, by the described hardening process, from a soft base material in portions of the first material volume 414 to hardened portion 404. The transition zone is evidence of rapid heating and cooling that extends through first layer 410 and into at least a front portion of second layer 408, which remains intact throughout the hardening process.

FIG. 5 is a flowchart 500 for a method of hardfacing a surface in accordance with aspects of this disclosure. The method includes a sub-process 502 for providing a first material volume composed of at least a heat treatable alloy of steel and including a first surface and a second surface adjacent to the first surface. Each of the first surface and the second surface is composed of at least a hardenable alloy of steel. Sub-process 504 determines that the first surface requires hardening. The determination may also be as to the specific surface requiring hardening. As such the sub-process 504 redirects the process in flowchart 500 to sub-process 502 for providing an appropriate first surface for hardening. When a determination occurs that the first surface requires hardening, in sub-process 504, sub-process 506 initiates. Sub-process 506 is application of an overlay to the second surface with at least a two-layer overlay. At least a first layer of the two-layer overlay, by an example welding process, using ductile low-carbon alloy of steel on the second surface and at least a second layer of the two-layer overlay is using a cobalt-based hardfacing over the first layer. As described with respect to FIGS. 3-4, the first layer and the second layer may be applied by a two-step welding process or by other overlay methods, such as by high velocity air fuel (HVAF), high velocity oxy-fuel (HVOF), or by thermal spraying. Intermediate steps may be included for cleaning and/or processing of each surface or layer prior to any subsequent layer applied. The two-layer overlay is adjacent to the first surface. Sub-process 508 is a local thermal process for at least one portion of the first material volume along with one portion of the second material volume. Sub-process 508 increases the hardness of the at least one portion of the first material volume relative to another portion of the first material volume, while the hardness and material properties of second material volume, required for the performance of the apparatus, remain unchanged. As discussed throughout this disclosure, an induction and subsequent quenching is applied to the first surface of the first material volume achieves such an increase in hardness of the at least one portion of the first material volume relative to other portions of the first material volume, while the hardness and material properties of second material volume, required for the performance of the apparatus, remain unchanged The specification and drawings are, accordingly, to be regarded in an illustrative rather than a restrictive sense. It will, however, be evident that various modifications and changes may be made thereunto without departing from the broader spirit and scope of the invention as set forth in the claims. In addition, the present apparatus and method of manufacture is available for other parts of a shear ram or a pipe ram or other impact driven features of a blowout preventer.

Example clauses: (1) In an implementation, an apparatus is disclosed as comprising: a first material volume with at least a hardened portion and a second material volume, the second material volume comprising at least two layers; the first material volume is composed of at least a hardenable alloy of steel; the at least two layers is located adjacent to a first surface comprising the hardened portion of the first material volume; the at least two layers comprising a first layer composed of at least a ductile low-carbon alloy of steel; and a second layer composed of at least a cobalt-based hardfacing over the first layer; and (2) in another implementation, a method comprising: providing a first material volume composed of at least a hardenable alloy of steel and comprising a first surface and a second surface adjacent to the first surface; overlay the second surface with at least a two-layer overlay comprising at least a first layer of ductile low-carbon alloy of steel on the second surface and at least a second layer of a cobalt-based hardfacing over the first layer, the two-layer overlay forming a second material volume adjacent to the first material volume; thermally processing at least one portion of the first material volume along with a portion of the second material volume to transform the at least one portion of the first material volume into a different hardness relative to another portion of the first material volume without affecting the hardness or other material properties, required for the performance of the apparatus, of the second material volume.

What is claimed is:

1. An apparatus comprising:
a first material volume with a hardened portion that is of a different hardness than a soft portion of the first material volume, the first material volume composed of at least a hardenable alloy of steel to be heat-treated to form the hardened portion; and
a second material volume comprising at least two layers, the at least two layers located adjacent to a surface of the hardened portion of the first material volume and the at least two layers comprising a first layer composed of at least a low-carbon alloy of steel and a second layer composed of at least a cobalt-based hardfacing over the first layer.

2. The apparatus of claim 1, wherein the second layer comprises between 50 wt % and 75 wt % of cobalt.

3. The apparatus of claim 1, wherein the first material volume comprises one of: CrMoV Steel, NiCrMo Steel, or CrNiMo Steel.

4. The apparatus of claim 1, wherein the at least two layers comprise a welded joint therebetween.

5. The apparatus of claim 1, wherein the hardened portion is an induction hardened portion.

6. The apparatus of claim 1, wherein the soft portion of the hardenable alloy of steel being of the different hardness than the hardened portion based in part on being covered from the heat-treated process.

7. The apparatus of claim 1, further comprising:
a transition zone formed adjacent to the hardened portion and in the first material volume.

8. A blow-out preventer (BOP) stack assembly comprising:
a shear ram housing comprising at least one upper ram shear block and at least one lower ram shear block;
at least one upper shear blade and at least one lower shear blade; and
the at least one lower shear blade further comprising:
a first material volume comprising a hardened portion of a different hardness than a soft portion of the first material volume, the first material volume composed of at least a hardenable alloy of steel to be heat-treated to form the hardened portion; and
a second material volume comprising at least two layers, the at least two layers located adjacent to a surface of the hardened portion of the first material volume and the at least two layers comprising a first layer composed of at least a low-carbon alloy of steel and a second layer composed of at least a cobalt-based hardfacing over the first layer.

9. The BOP stack assembly of claim 8, wherein the second layer comprises between 50 wt % and 75 wt % of cobalt.

10. The BOP stack assembly of claim 8, wherein the first material volume comprises one of: CrMoV Steel, NiCrMo Steel, or CrNiMo Steel.

11. The BOP stack assembly of claim 8, wherein the at least one lower ram shear block is a unibody structure comprising the at least one lower shear blade, and wherein the at least one upper ram shear block is a unibody structure comprising the at least one upper shear blade.

12. The BOP stack assembly of claim 8, wherein the at least one lower shear blade is attached to the at least one lower ram shear block, and wherein the at least one upper shear blade is attached to the at least one upper shear ram shear block.

13. The BOP stack assembly of claim 8, wherein the hardened portion is an induction hardened portion.

\* \* \* \* \*